June 29, 1948.  J. A. WALSH, JR  2,444,177
METHOD FOR PRODUCING CURING BAGS FOR TIRE CASINGS
Filed Aug. 18, 1945  3 Sheets-Sheet 1
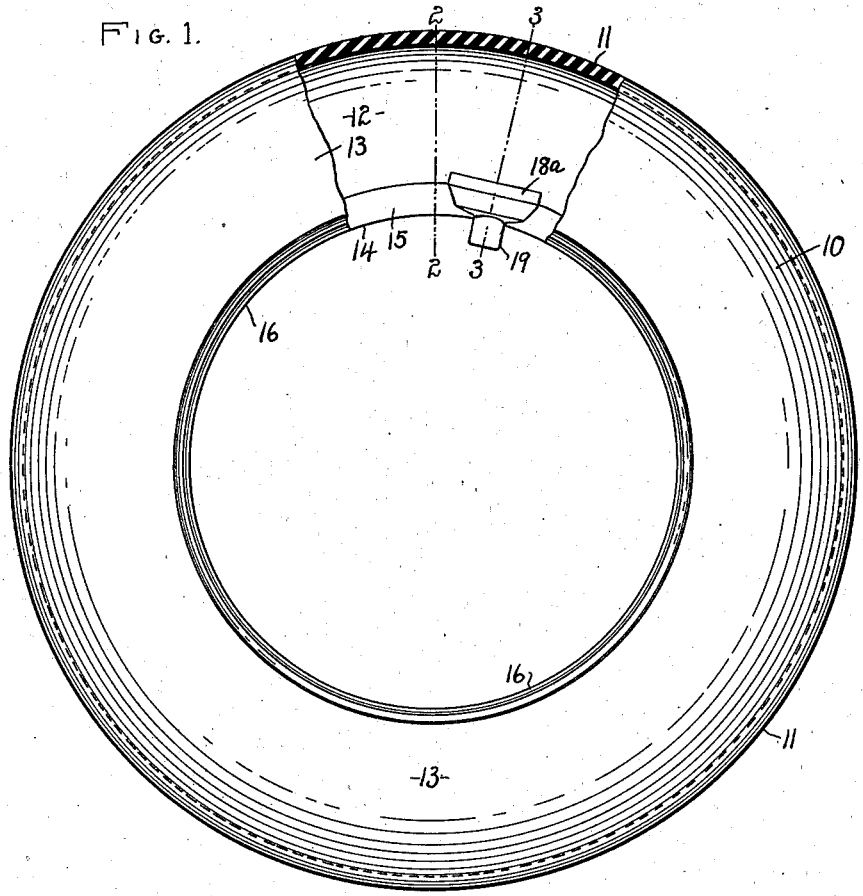
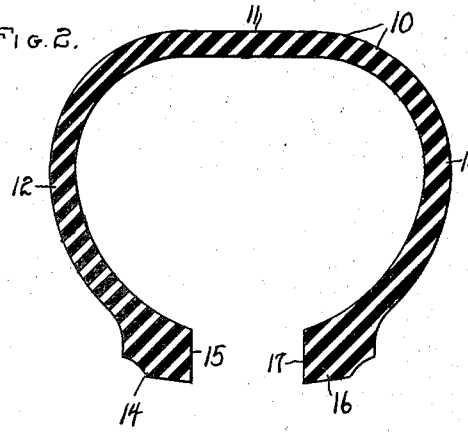
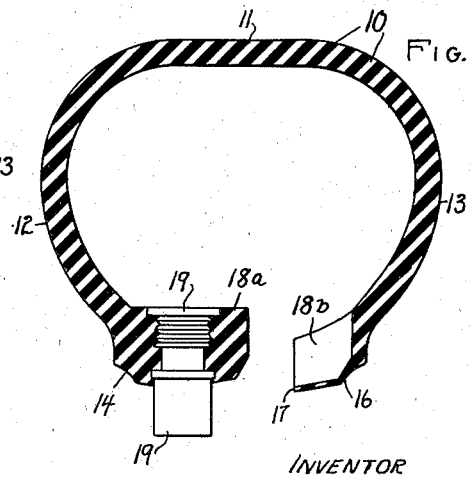
INVENTOR
JAMES A. WALSH, JR.
BY Seymour, Carter & Nichols
ATTORNEYS June 29, 1948.　　　　　J. A. WALSH, JR　　　　　2,444,177
METHOD FOR PRODUCING CURING BAGS FOR TIRE CASINGS
Filed Aug. 18, 1945　　　　　　　　　　　　　3 Sheets-Sheet 2
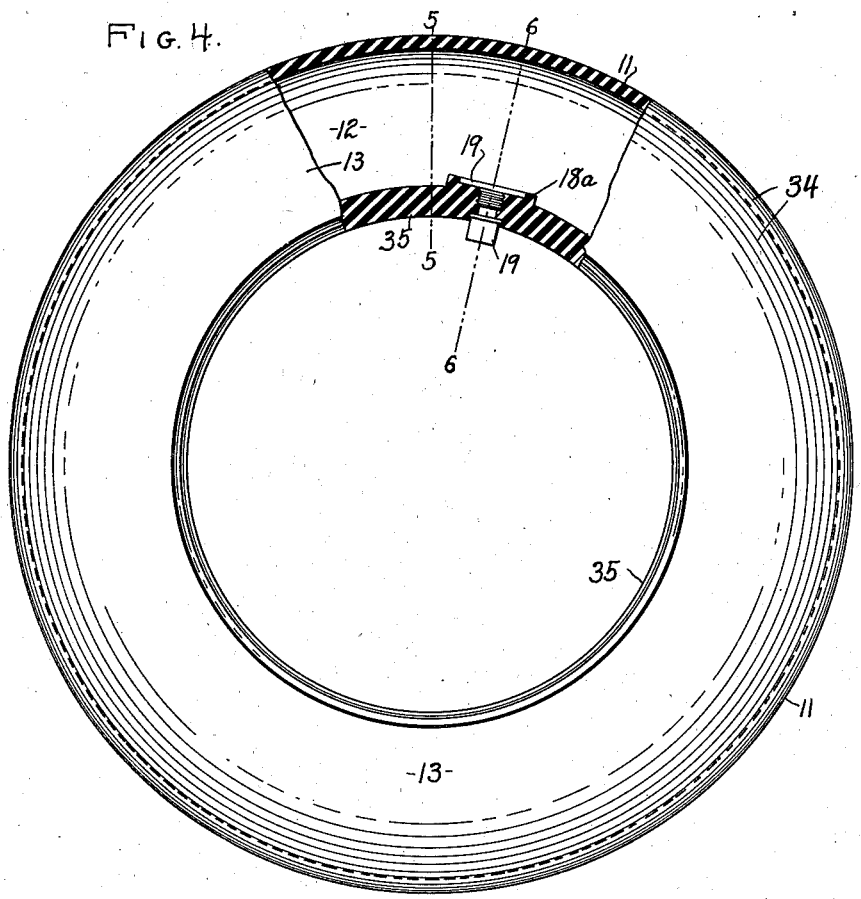
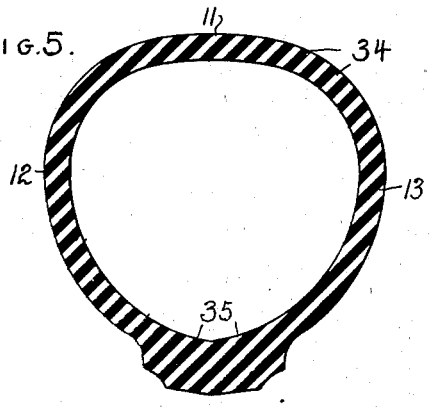
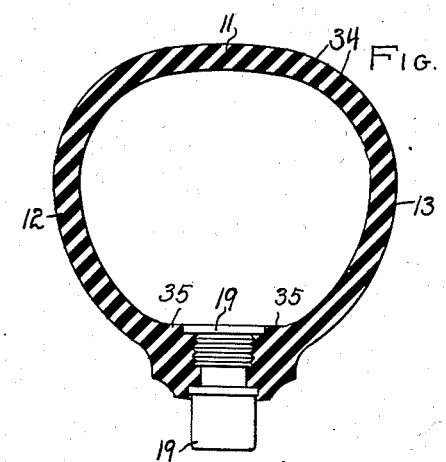
INVENTOR
JAMES A. WALSH, JR.
BY
Seymour, Carle & Nichols
ATTORNEYS June 29, 1948.  J. A. WALSH, JR  2,444,177
METHOD FOR PRODUCING CURING BAGS FOR TIRE CASINGS
Filed Aug. 18, 1945   3 Sheets-Sheet 3

INVENTOR
JAMES A. WALSH, JR.
BY
Seymour, Earle & Nichols
ATTORNEYS

Patented June 29, 1948

2,444,177

UNITED STATES PATENT OFFICE 2,444,177

METHOD FOR PRODUCING CURING BAGS FOR TIRE CASINGS

James A. Walsh, Jr., West Haven, Conn.

Application August 18, 1945, Serial No. 611,277

2 Claims. (Cl. 18—48)

The present invention relates to improvements in methods for producing curing-bags for tire-casings, i. e., bags of rubber or other suitable flexible or elastic material, which are adapted to be fitted within an unvulcanized or partly vulcanized tire-casing preparatory to curing or vulcanization thereof and which serve to expand the tire-casing outwardly into snug engagement with the interior surfaces of a mold. Such curing-bags are commonly charged with superheated water (under pressure) or other suitable heating fluid, to aid in effecting the vulcanization of the tire-casing in conjunction with heat applied through the enveloping mold.

One of the main objections to curing-bags as currently in use is that they vary in wall thickness from bag to bag, with the result that the vulcanizing time at a given temperature cannot be relied upon to produce proper curing with different curing-bags. Furthermore, prior curing-bags have usually been open to a further objection that a given curing-bag will vary materially in the wall thicknesses at different points both in a transverse direction and in a longitudinal or circumferential direction, with the result that the heating and hence the curing of the tire-casing will differ materially from spot to spot. This latter condition results either in the proper curing of some sections of a tire-casing together with the over-curing of other sections thereof, or it results in the under-curing of certain sections of the tire-casing in conjunction with better curing at other locations thereon.

One of the objects of the present invention is to provide a superior method whereby a plurality of curing-bags may be produced in such manner that each thereof is substantially identical in wall thickness and may, therefore, be relied upon to provide the same curing or vulcanizing effect (other conditions being equal) as will another bag of the group.

Another object of the present invention is to provide a superior method for producing curing-bags whereby the curing-bags may have substantially-uniform wall thicknesses at substantially all circumferentially-different points.

A further object of the present invention is to provide a superior method of the character referred to whereby curing-bags may be produced at low cost.

Still another object of the present invention is to provide a superior method for producing curing-bags and by means of which a multiplicity of such curing-bags may be produced each having substantially-identical cross-sectional form as compared to another of said curing-bags, to thereby enable each curing-bag to produce substantially-identical results as compared to another curing-bag produced by the present method.

A still further object of the present invention is to provide a superior method of the character referred to whereby curing-bags may be produced without requiring transverse joints which alter the conformation and hence the heat-conductivity of the bags.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a face view partly in section of a curing-bag produced in accordance with the present invention and shown at the stage of its production wherein its base-beads are not yet joined together;

Fig. 2 is a transverse sectional view taken on the line 2—2 of Fig. 1 but on a larger scale;

Fig. 3 is a similar view taken on the line 3—3 of Fig. 1;

Fig. 4 is a view similar to Fig. 1 but showing the curing-bag after its base-beads have been united to provide a fully-formed curing-bag;

Fig. 5 is a transverse sectional view taken on the line 5—5 of Fig. 4 but on a larger scale;

Fig. 6 is a similar view taken on the line 6—6 of Fig. 4; and

Figure 7:
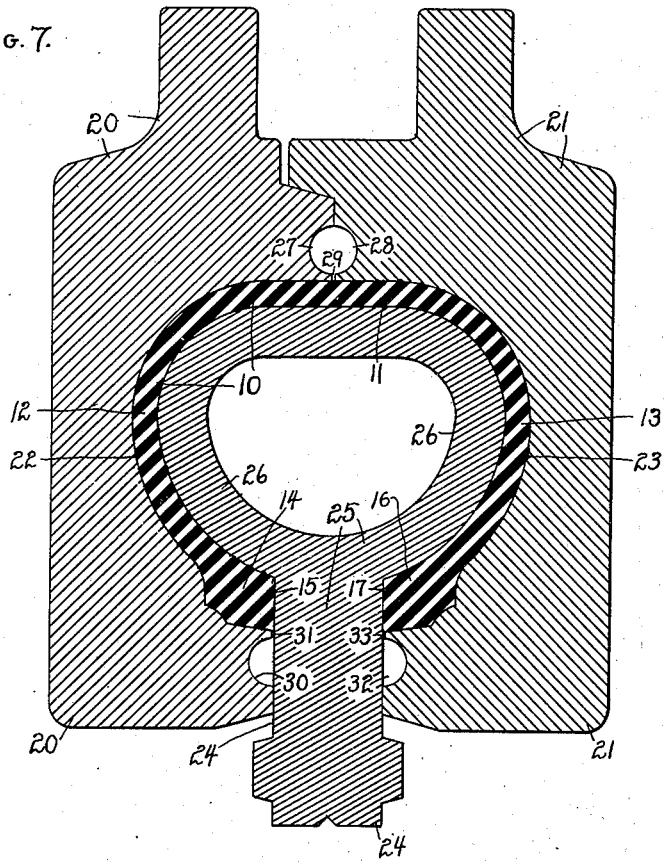
Fig. 7 is a transverse sectional view taken through the partly-completed joint-bag at a point corresponding to the section shown in Fig. 2 but including an internal core and an external mold.

By way of example of a preferred mode of carrying out the present invention, I first produce a partly-formed curing-bag generally designated by the reference character 10 and shown in Figs. 1, 2, 3 and 7. The said curing-bag may be produced of a wide variety of materials having the desired degree of elasticity such, for instance, as natural rubber or synthetic rubber.

The partly-formed curing-bag 10 includes an outer or peripheral wall 11 integrally uniting two opposite side walls 12 and 13 each of which latter curves inwardly toward the other at its lower portion. The side wall 12 terminates in a relatively-thick base-bead portion 14 having a substantially-flat inner face 15. The side wall 13 similarly terminates in a base-bead portion 16 having a substantially-flat inner face 17 extending parallel with the inner face 15 but laterally spaced therefrom. The said inner faces 15 and 17 are adapted, as will hereinafter appear, to be brought into firm engagement and to be merged one into the other.

The base-bead portion 14 of the partly-formed curing-bag 10 is formed with an integral lug 18a, as is shown especially well in Figs. 1 and 3, and which projects beyond the inner face 15 of the said base-bead portion 14 toward the bead-portion 16. The inner part of the base-bead portion 16 is, in turn, formed with a lug-recess 18b positioned directly opposite the lug 18a and shaped to snugly receive the same when the two complemental base-bead portions 14 and 16 are brought together in a manner as will hereinafter appear. Mounted in the lug 18a is a coupling-fitting 19 through which hot water or other heating fluid may be introduced into the interior of the curing-bag and drained therefrom, also in a manner as will hereinafter appear.

In producing the partly-formed curing-bag 10, I prefer to employ a male mold-member 20 and a complemental female mold-member 21, interfitting as is shown in Fig. 7. The mold-members 20 and 21 are of a ring-like form as is common in the art and are respectively provided in their respective inner faces with one of two molding-cavities 22 and 23 respectively which determine the conformation of the outer surfaces of the curing-bag 10.

The molding-cavities 22 and 23 above referred to open toward each other and form a substantially-continuous sweep at their outer portions, as is shown in Fig. 7, while being laterally spaced apart at their inner portions by the plate-like shank-portion 24 of a core-member generally-designated by the reference character 25.

The said plate-like shank-portion 24 fits snugly between the laterally-spaced-apart inner portions of the mold-members 20 and 21.

The core-member 25 also includes a hollow head-portion 26 having a transverse outer contour corresponding to the desired contour of the inner surfaces of the partly-formed curing-bag 10, as is shown in Fig. 7, save the inner faces 15 and 17 which have their contours determined mainly by the shank-portion 24.

In the upper portion of its inner face, the male mold-member 20 is formed with a flash-groove 27 of substantially-semicircular form in cross section and facing in opposition to a similar flash-groove 28 formed in the upper portion of the inner face of the female mold-member 21 to provide a substantially-circular chamber or channel for the reception of excess (if any) rubber or the like when the curing-bag 10 is being formed.

The inner face-portions of the respective interfitting mold-members 20 and 21 immediately inwardly of their respective flash-grooves 27 and 28, are slightly spaced apart as at 29 to permit excess rubber or the like to flow into the flash-grooves 27 and 28 when required.

The lower portion of the inner face of the male mold-member 20 is formed with a flash-groove 30 having a substantially-semicircular cross-sectional form and opening laterally toward the adjacent face of the shank-portion 24 of the core-member 25, as is shown in Fig. 7. Preferably and as shown, the portion of the inner face of the mold-member 20 between the lower portion of the molding-cavity 22 and the flash-groove 30, is spaced slightly away from the shank-portion 24, as is indicated in Fig. 7 to provide a narrow passage 31 for the flow of excess rubber or the like into the flash-groove 30.

Similarly, the lower portion of the inner face of the mold-member 21 is formed with a flash-groove 32 facing in opposition to the flash-groove 30 and hence toward the adjacent side of the shank-portion 24 of the core-member 25. The portion of the inner face of the mold-member 21 lying intermediate the lower portion of the molding-cavity 23 and the flash-groove 32 is set back or relieved to provide a narrow passage 33 which permits excess rubber or the like to flow into the said flash-groove 32 when conditions require in the same manner as the said rubber or the like may flow into the flash-groove 30 just above referred to.

After a suitable degree of vulcanization or curing the partly-formed curing-bag 10 may have the mold-members 20 and 21 removed therefrom after which the said curing-bag may be stripped-off from the core-member 25, preparatory to subsequent operations.

The so-called "partly-formed" curing-bag 10 shown in Figs. 1, 2, 3 and 7 may be either fully cured or vulcanized or just sufficiently cured or vulcanized to render it stable in handling. The next stage in the production of a finished curing-bag is to couple the base-bead portions 14 and 16 together and to couple the outer edge-portions and the under portion of the lug 18a to the surfaces of the lug recess 18b.

To accomplish the above result, it is preferred to thoroughly buff and clean the respective inner faces 15 and 17 of the base-bead portions 14 and 16, as well as the surfaces of the lug 18a and the lug-recess 18b. Following the buffing and cleaning referred to, the said surfaces may all be coated with a rubber or other suitable cement, as is well known in the art for securing rubber and similar articles together. The cement referred to is preferably of the type which may be vulcanized or cured.

After the inner faces 15 and 17 and the lug 18a and lug-recess 18b have been suitably coated with cement, the respective base-bead portions 14 and 16 may be brought together and the structure subjected to a curing or vulcanizing step to cause the two base-bead portions 14 and 16 to, in effect, become one, and thus provide the finished curing-bag 34 of Figs. 4, 5 and 6 with an integral inner wall 35. At the same time that the base-bead portions 14 and 16 are caused to unite and lose their individual identities, the lug 18a will have its previously-free outer edge surfaces and its under surfaces merged into the contacting surfaces of the lug-recess 18b so that the said lug-recess loses its identity and the said lug 18a becomes an integral part of the newly-produced inner wall 35, all as is especially well shown in Fig. 6.

As thus produced, the finished curing-bag 34 may be duplicated time after time, with the result that the subsequently-produced curing-bag will in all respects correspond to the curing-bag 34. Thus any of such curing-bags may be utilized in effecting the vulcanization or curing of a tire-casing with corresponding degrees of cure.

Furthermore, the finished curing-bag 34 is substantially uniform in wall-thickness at any circumferentially-displaced point as compared to another similar point, and is free of bulky transverse seams or the like.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claims are intended to be embraced therein.

I claim:

1. The method of producing a ring-like hollow curing-bag, comprising the steps of: providing a body of rubber; confining the body of rubber in a ring-like mold substantially-U-shaped in cross section; molding said body of rubber to form a ring-like partially-vulcanized curing-bag characterized by a peripheral wall and two opposite side walls integrally united therewith and having substantially-symmetrical circumferential base-bead portions provided with oppositely-disposed faces and simultaneously molding a pocket-like recess in the face of one of said circumferential base-bead portions of said curing-bag and an integral apertured recess mating lug projecting laterally from the face of the opposite circumferential base-bead portion of said curing-bag toward and substantially opposite the said recess of the first circumferential base-bead portion; inserting a coupling-fitting in the aperture of said lug; joining the oppositely-disposed faces of the circumferential base-head portions of the partially-vulcanized U-shaped curing-bag, including the mating surfaces of said lug and said recess; and then completing the vulcanization of said curing-bag to provide a ring-like hollow bag having a fluid-tight wall with said coupling-fitting extending therethrough.

2. The method of producing a ring-like hollow curing-bag, comprising the steps of: providing a body of rubber; confining the said body of rubber in a ring-like mold substantially-U-shaped in cross section; molding said body of rubber to form a ring-like partially-vulcanized curing-bag characterized by a peripheral wall and two opposite side walls integrally united therewith and having substantially-symmetrical circumferential base-bead portions provided with oppositely-disposed faces and simultaneously molding a pocket-like recess in the face of one of said circumferential base-bead portions of said curing-bag having a bottom wall coincident with the outer part of said one base-bead portion, and an integral apertured recess-mating lug projecting laterally from the face of the opposite circumferential base-bead portion of said curing-bag toward and substantally opposite the said recess of the first circumferential base-bead portion so as to make a snug fit therein; inserting a coupling-fitting in the aperture of said lug; joining the oppositely-disposed faces of the circumferential base-bead portions of said partially-vulcanized curing-bag, including the mating surfaces of said lug and said recess with the bottom wall of the latter overlying the outer part of said lug; and then completing the vulcanization of said curing-bag to provide a ring-like hollow bag having a fluid-tight wall with said coupling-fitting extending therethrough.

JAMES A. WALSH, Jr.

REFERENCES CITED

The following references are of record in the file of this patent:

UNITED STATES PATENTS

| Number | Name | Date |
| --- | --- | --- |
| 1,575,421 | Engler | Mar. 2, 1926 |
| 1,749,013 | Wolfe et al. | Mar. 4, 1930 |
| 1,871,120 | Denmire | Aug. 9, 1932 |